FIG-2
A
B
C
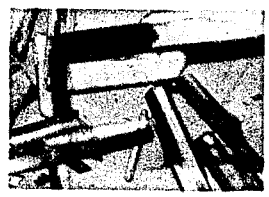

United States Patent Office 3,505,013
Patented Apr. 7, 1970

3,505,013
WET PROCESS FOR THE MANUFACTURE
OF PHOSPHORIC ACID
Kazuo Araki, Yokohama, Yasuo Iijima, Kamakura, Koichi Sano, Kazuo Shindo, and Yoo Saito, Yokohama, Iwakichi Kawaguchi, Hiratsuka, Minoru Hosoda, Kawasaki, and Keiichi Murakami, Sendai, Japan, assignors to Nippon Kokan Kabushiki Kaisha, and Toyo Engineering Corporation, both of Tokyo, Japan
Continuation of application Ser. No. 234,493, Oct. 31, 1962. This application Sept. 20, 1966, Ser. No. 580,833
Claims priority, application Japan, June 23, 1962, 37/26,241
Int. Cl. C01f 1/46; C01b 25/18
U.S. Cl. 23—122                                    10 Claims

ABSTRACT OF THE DISCLOSURE

Phosphoric acid and gypsum are obtained in a continuous process by the hemihydrate-dihydrate calcium sulfate method. Phosphate rock is first decomposed by sulfuric acid and phosphoric acid and a calcium sulfate hemihydrate slurry is obtained. The decomposition is effected above the temperature of the transition from the hemihydrate to the dihydrate. The sulfuric acid concentration in the resulting hemihydrate slurry is maintained above 2% and the total concentration of sulfuric acid and phosphoric acid in the slurry is below about 35%. The calcium sulfate hemihydrate is then hydrated to the calcium sulfate dihydrate at 45–70° C. by adding separately formed calcium sulfate dihydrate seed crystals of the twin crystal type of a size between 5 and 50 microns which are directly obtained by decomposing a lime containing substance with sulfuric acid or sulfuric acid containing phosphoric acid at a temperature below the transition temperature. From the precipitating calcium sulfate dihydrate slurry phosphoric acid and gypsum is then recovered while part of the dihydrate slurry is recirculated back to the hemihydrate slurry to provide for a ratio between 2:1 and 4:1 between dihydrate slurry and hemihydrate slurry.

Figure 1:
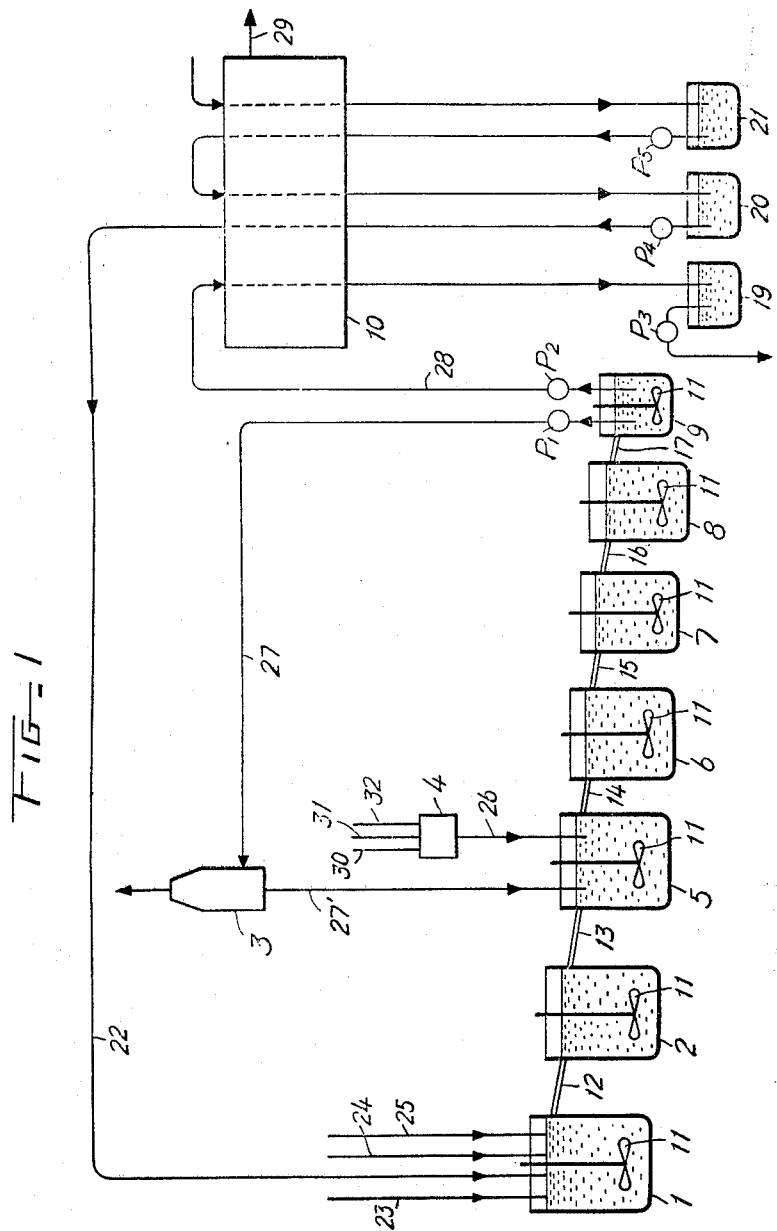

This application is a continuation of S.N. 234,493, filed Oct. 31, 1962 and now abandoned.

The present invention relates to the wet process for the manufacture of phosphoric acid, and more particularly to improvements in the semihydrate-dihydrate calcium sulfate method of producing phosphoric acid which permits easy separation of calcium sulfate dihydrate without the carrying with it of any phosphate impurities, the phosphoric acid and calcium sulfate dihydrate (gypsum) being produced from phosphate rock.

It is known that in the wet process of manufacturing phosphoric acid from phosphate rock the quality of the byproduct gypsum which is produced by the semihydrate-dihydrate method is better than in the case of the gypsum produced by the direct dihydrate method. In addition to the quality of the gypsum being better, the weight of recovery of the gypsum is greater in the semihydrate-dihydrate method than in the direct hydrate method.

Thus, in the wet process manufacture of phosphoric acid by the conventional direct dihydrate method, the structure of the crystals of the byproduct calcium sulfate dihydrate ($CaSO_4 \cdot 2H_2O$) and the crystal structure of the $CaHPO_4 \cdot 2H_2O$ closely resemble each other, as will be further discussed below, with the result that a part of the $HPO_4^{--}$ is substituted for a part of the $SO_4^{--}$ in the crystalline $CaSO_4 \cdot 2H_2O$.

The above is clear from the following comparison of the crystal structures:

|  | (a) KX (A.) | (b) KX (A.) | (c) KX (A.) | ($\beta$.) |
|---|---|---|---|---|
| $CaSO_4 \cdot 2H_2O$ | 10.47 | 15.15 | 6.51 | 151°33' |
| $CaHPO_4 \cdot 2H_2O$ | 10.47 | 15.15 | 6.37 | 150°08' |

When the phosphorus is combined in the gypsum byproduct as indicated above, it becomes impossible to recover it. It cannot be washed away from the gypsum, as in the case of adhering phosphoric acid.

On the other hand, in the semihydrate method, the calcium sulfate semihydrate ($CaSO_4 \cdot \frac{1}{2} H_2O$) is produced as a byproduct and the crystal structure thereof is different from that of $CaSO_4 \cdot 2H_2O$. Upon recrystallization to invert the calcium sulfate semihydrate to calcium sulfate dihydrate, $CaHPO_4 \cdot 2H_2O$ does not occur if the sulfuric acid is present in more than 2% by weight in the phosphoric acid solution. Consequently, the gypsum byproduct contains almost none of the above mentioned phosphate compound, and has the physical characteristics of pure gypsum. This, in turn, improves the recovery rate of phosphoric acid.

However, in the conventional semihydrate-dihydrate method outlined above, active seed crystals cannot be obtained. Furthermore, in the case of a continuous operation, a gradual worsening of the seed, and of the final product, becomes inevitable.

Some wet processes for manufacturing the phosphoric acid recognized to be a semihydrate-dihydrate method have been published in the literature. However, all of these methods are limited for use only in experimental and inefficient batch type methods and cannot be used as a continuous industrial method.

It is accordingly a primary object of the present invention to provide a wet process semihydrate-dihydrate calcium sulfate method of producing phosphoric acid from phosphate rock which can be carried out continuously and on an industrial scale with a high degree of yield and with the production of the products in pure, usable form.

In the conventional semihydrate-dihydrate method, the conditions concerning the process of transition from calcium sulfate semihydrate to calcium sulfate dihydrate (gypsum) which govern formation of seed crystals and their growth to coarse gypsum, have not been controlled in the manner necessary to give the best possible results. Consequently, the speed of hydration is slow and the size of the gypsum crystals produced is small. In addition, at the same time, the separation of the gypsum from the phosphoric acid is difficult, thus making the industrial operation of the conventional semihyrate-dihydrate method impossible.

We have discovered that in order to make the semihydrate-dihydrate method industrially possible it is necessary to use active, good seed crystals. It is of course desirable that such seed crystals be obtained by a simple method, and that a small amount of seeds be enough for this purpose.

It is accordingly another object of the present invention to provide for a method of producing crystals of calcium sulfate dihydrate which are particularly suitable as seed crystals for the precipitation of calcium sulfate dihydrate from a calcium sulfate semihydrate slurry.

It is another object of the present invention to provide a method of producing calcium sulfate dihydrate crystals which in a very simple and easy manner results in the production of crystals which are of the highest suitability for use as seed crystals and which have the highest degree of activity for this purpose.

We have found that there are two types of crystals of calcium sulfate dihydrate, namely a single crystal, and a twin crystal, and that one or the other type of crystals is formed according to the conditions used for producing the same.

There is a considerable difference in the speed of growth in phosphoric acid solution between these two types of crystals. Thus, it has been found that the growth of calcium sulfate dihydrate crystals of the twin type is much greater than in the case of the use of calcium sulfate dihydrate crystals of the single type as seeds.

In general it has been found that it is preferable that seed crystals be formed as quickly as possible and that the time between the formation and the use of the seed crystals be as short as possible, because the crystal having the rough surface structure has the higher degree of activity. Consequently, powder of natural gypsum or seeds long exposed to air are not effective.

The phosphoric acid solution restricts the growth of gypsum crystals to some extent, and it has been found that the impurities coming from phosphate rock restrict the growth of the crystals at the "1" surface or where the growing speed is at its maximum. This also occurs when the concentration of sulfuric acid in the calcium sulfate semihydrate slurry decreases to below 2%, in which case a solid solution of $CaHPO_4 \cdot 2H_2O$ is formed and the growth ceases. Still further, it has been found that by adjustment of the temperature of the slurry in the hydration of the calcium sulfate semihydrate the calcium sulfate dihydrate the time necessary for the hydration is shortened.

It is therefore yet another object of the present invention to provide a method of producing calcium sulfate dihydrate crystals of the twin crystal type which are particularly suitable as seed crystals for the precipitation of calcium sulfate dihydrate, calcium sulfate semi-hydrate slurry, and to provide for the use of the seed crystals in the wet process of manufacturing phosphoric acid by the semihydrate-dihydrate calcium sulfate method.

It is still another object of the present invention to provide for the use of such calcium sulfate dihydrate seed crystals of the twin crystal type in a manner so as to achieve the best possible hydration of calcium sulfate semihydrate to calcium sulfate dihydrate in the semihydrate-dihydrate calcium sulfate wet process for the manufacture of phosphoric acid from phosphate rock.

Other objects and advantages of the present invention will be apparent from a further reading of the specification and of the appended claims.

With the above and other objects in view, the present invention mainly comprises a method of producing calcium sulfate dihydrate crystals of the twin crystal type which are particularly suitable as seed crystals for the precipitation of calcium sulfate dihydrate of the calcium sulfate semihydrate slurry obtained during the wet process manufacture of phosphoric acid from phosphate rock, which comprises reacting a lime-containing substance with concentrated sulfuric acid.

In accordance with the present invention the calcium sulfate dihydrate crystals obtained by reacting the lime-containing substance with the concentrated sulfuric acid are directly used as seed crystals in the hydration of calcium sulfate semihydrate from a slurry containing the same obtained by decomposing phosphate rock by the action thereon of sulfuric acid and phosphoric acid, the addition of the calcium sulfate dihydrate crystals to the calcium sulfate semihydrate slurry resulting in the precipitation of the calcium sulfate dihydrate in relatively pure form from the slurry in a rapid and easily controllable manner.

It has been found that active twin type seed crystals of calcium sulfate dihydrate are obtained by the decomposition of a lime-containing substance such as phosphate rock, limestone, slaked lime, lime silicate and other lime compounds by means of sulfuric acid or sulfuric acid containing phosphoric acid. The seed crystals of calcium sulfate dihydrate obtained in this manner are fine crystals of the twin type having a high degree of activity in growth of other crystals of calcium sulfate dihydrate. These seed crystals obtained by the action of the concentrated sulfuric acid, for example sulfuric acid of 60 to 98% concentration, on a lime-containing substance can be directly used as seeds in the hydration of calcium sulfate semihydrate to calcium sulfate dihydrate.

Thus, since the seed crystals obtained in this manner are of a fine size of 5–50 microns, and preferably of about 10 microns, no pulverization, sizing, or complicated synthesis is required as in the case of conventional methods. In addition, these seeds have a high degree of activity and it is possible to use as little as ¼ to $\frac{1}{40}$ of the amount of seed crystals as would be necessary in the conventional method.

Accordingly, it is unnecessary using the seed crystals of the present invention to make repeated use of the produced gypsum as seeds, as in conventional methods, and as a result, the deterioration of the seeds by repeated use can be avoided.

In addition, the shape of a seed, as mentioned above, greatly influences the growing conditions of the formed crystals, and a crystal of gypsum in the shape almost the same as that of the seed is formed and grows to a maximum size of about 700 microns. However, the size of the produced gypsum can be made to be almost uniform, at a desired suitable size, using the seed crystals of the present invention in the method of the present invention, making it easier to sepaarte the gypsum from the phosphoric acid solution in the filtering process which follows the refining.

The present invention is applicable to the production of phosphoric acid and calcium sulfate dihydrate from any natural phosphate rock from anywhere in the world. Among the prosphate rocks for which the method of the present invention is particularly applicable are the Florida phosphate rocks of low and high content, including calcined Florida phosphate rock, Makatea, Kosier, Morocco, Israel and Togo phosphate rocks.

Natural phosphate rock generally contains some impurities, and the type and quantities of such impurities varies considerably depending upon the particular source of the phosphate rock. The method of the present invention is applicable to all types of phosphate rocks, no matter what the impurities, and in the cases where the phosphate rock contains impurities, it is further possible that in accordance with embodiments of the present invention to minimize the effect of such impurities on the production of phosphoric acid and calcium sulfate dihydrate in accordance with the method of the present invention.

It has been found that even using the seeds of the calcium sulfate dihydrate crystals produced in accordance with the method of the present invention the presence of certain impurities can retard the growth of the calcium sulfate dihydrate crystals. It should be noted, however, that even with such impurities the results which are achieved using the twin type crystals of calcium sulfate dihydrate produced in accordance with the method of the present invention as seeds are much better than if any other type of seeds are used or if no seeds are used. However, as indicated above, the present invention also comprises improvements which can avoid the difficulties due to the presence of impurities.

We have found that the impurities which retard the speed of hydration and the growth of crystals of calcium sulfate dihydrate in the semihydrate-dihydrate method of the present invention, even when using the seed crystals of the present invention, are hydrofluoric acid and organic impurities. Thus, it has been found that organic impurities in the phosphate rock adhere to the growing surface of the gypsum crystal, inhibiting diffusion and growth of $Ca^{++}$ and $SO_4^{--}$.

We have further found that these inhibiting effects can be eliminated by adding easily reacting, that is surface active, silicic acid which adsorbs the organic impurities.

It has further been found that fluorinated compounds in the phosphate rock are decomposed by the sulfuric acid used in the decomposition of the phosphate rock to phosphoric acid and calcium sulfate, to become hydrofluoric acid. This hydrofluoric acid tends to react with the easily reacting silicic acid, thereby freeing the adsorbed organic impurities which then have their inhibiting effect in the formation of the calcium sulfate dihydrate crystals. Accordingly, as will be further shown below, where such fluorinated compounds are present along with the organic impurities the amount of silicic acid added should be sufficient to react with the hydrofluoric acid and also to adsorb the organic impurities.

Thus, in accordance with the present invention, the easily reacting silicic acid-containing substance such as diatomaceous earth, silica gel, bentonite and silica slag is added to the slurry containing the hydrofluoric acid in solution to convert the hydrofluoric acid to hydrofluosilicic acid ($H_2SiF_6$), and at the same time, to adsorb the mentioned organic impurities. Such addition of easily reacting silica is not necessary where there is adequate silicic acid in the raw material rock, for example, in the case of Kosia phosphate rock, to perform the defluorinating function as well as to adsorb the organic impurities.

Free silicic acid in mineralogical quartz remains intact during the formation of the gypsum, so that it is necessary to add only enough easily reacting silica to supplement the present free silicic acid and to have enough present to convert the hydrofluoric acid to hydrofluosilicic acid and to adsorb the organic impurities. Thus, the amount of silica added to the phosphate rock depends upon whether or not the phosphate rock contains fluorine and organic impurities, how much of such impurities are contained in the phosphate rock, and whether or not the phosphate rock contains silica, and how much silica is contained in the phosphate rock. In general, even with phosphate rock containing little or no silica not more than about 3% of silica need be added. In some cases it is of course possible to have no silica added at all, and in other cases, for example in Florida rock containing a relatively high percentage of silica and also containing impurities, as little as 1% of silica is sufficient.

The following table indicates the amounts of easily reacting silica to be added with different phosphate rocks:

| | Percent [1] |
|---|---|
| Florida, low (BPL 68) | 1 |
| Florida, high (BPL 77) | 2 |
| Calcined Florida, high (BPL 80) | 0 |
| Makatea | 3 |

[1] Amount of easily reacting silica to be added.

In accordance with another embodiment of the present invention it is possible to avoid the interference with the growth of the calcium sulfate dihydrate crystals by hydrofluoric acid and organic impurities by eliminating the organic impurities by the expedient of roasting the phosphate rock. The roasting should be at a temperature and for a time sufficient to carbonize and remove the organic impurities. In the case of certain phosphate rock such as Makatea phosphate rock it is sufficient to roast the rock for 2 hours at a temperature of 600° C. In general, however, the most preferred temperature of roasting, considering a time of about 2 hours is between about 800 and 1000° C., and it is generally unnecessary to roast at a temperature greater than 1200° C.

In accordance with still another embodiment of the present invention, the concentration of sulfuric acid in the semihydrate calcium sulfate slurry is maintained within the range so as to be most beneficial for the growth of gypsum crystals and the time of hydration required therefor. It has been found that if the concentration of sulfuric acid is high, the quality of the phosphoric acid is lowered, and if the concentration of sulfuric acid is low, the quality of the byproduct gypsum is lowered. However, we have found that using the seed crystals of the present invention, if the concentration of sulfuric acid in a completely decomposed calcium sulfate semihydrate slurry is too low, then $CaHPO_4 \cdot 2H_2O$ forms as a solid solution in the gypsum. As a result, the growth of the gypsum crystals stops, the hydrating time becomes longer, and breaking due to oversaturation occurs. This results in the production of many miscellaneous types of crystals other than the twin type and consequently, the crystals of the produced gypsum are relatively small in size.

We have therefore determined that the concentration of the sulfuric acid in the calcium sulfate semihydrate slurry should be maintained at above 2%, preferably between 2% and 5%, and most preferably at about 3% and in addition, the total percentage of the $P_2O_5$ of the phosphoric acid and of the sulfuric acid should be below 35%. If the total percentage of phosphoric acid $P_2O_5$ and sulfuric acid is greater than 35% the time of hydration is longer and the size of the gypsum crystals becomes smaller. It has been found that by maintaining the concentration of sulfuric acid and the total concentration of sulfuric acid and phosphoric acid $P_2O_5$ within the above mentioned limits the gypsum crystals grow smoothly and the time of hydration is shortened, without any loss of quality of the produced phosphoric acid.

In the book "Phosphoric Acid, Phosphates and Phosphatic Fertilizers" by Waggamann, page 185, it is stated that if the quantity of sulfuric acid is 3–4% above the quantity suitable for reaction, the mineral phosphate powder is coated with gypsum and the mineral powder remains undecomposed, resulting in loss of phosphoric acid. However, this is a description of the direct dihydrate gypsum method, whereas the method of the present invention relates to the semihydrate-dihydrate method in which the decomposing conditions are different from the dihydrate case in that the phosphate rock powder does not remain undecomposed even when the concentration of sulfuric acid is within the above-mentioned range, but, rather, under actual operation, the recovery rate of phosphoric acid can be raised to be above 98% which is higher than in the direct dihydrate method (about 96%).

According to yet another embodiment of the present invention the ratio of the circulating slurry is adjusted so as to give the best possible results for the purposes of the invention. In cases wherein the quantity of circulating slurry containing calcium sulfate dihydrate is increased, the transition velocity of calcium sulfate semihydrate increases and the time for hydration is correspondingly decreased. According to the present invention, the ratio of the quantity of circulating gypsum slurry to the quantity of inflow of the decomposed slurry into the hydration tank is maintained at between 2:1 and 4:1, and the temperature of the slurry in the hydrating tank is maintained at between 45–70° C., preferably 55–65° C., and most preferably at about 60° C.

If the ratio is below 2:1, the hydration becomes difficult because the temperature in the hydrating tank does not drop to the preferred temperature for the hydration. On the other hand, if the ratio is greater than 4:1, the circulating quantity unnecessarily increases and hydration tanks of larger capacity are required.

In forming the calcium sulfate dihydrate seed crystals of the present invention by the reaction of sulfuric acid on a lime-containing substance, it is preferred to carry out this reaction at a temperature of 40–70° C., and most preferably at a temperature of about 55° C.

On the other hand, in decomposition of the phosphate rock by the action of sulfuric acid and phosphoric acid thereon, to form a slurry including calcium sulfate semihydrate, it is preferred to carry out the reaction at a temperature of 85–100° C., and most preferably at a temperature of about 90° C.

It is further preferred in this decomposition reaction of the phosphate rock by sulfuric acid and phosphoric acid to use sulfuric acid of preferably 22–32% concentration, and most preferably of about 27% concentration, and to correspondingly use phosphoric acid of 10 to 20% concentration, and most preferably of about 14% concentration.

The amount of phosphoric acid used in this decomposition reaction is preferably 1 to 2 times the amount of $P_2O_5$ in the phosphate rock, and most preferably about 1½ times the amount of $P_2O_5$ in the phosphate rock. The total acid concentration (sulfuric acid plus phosphoric acid) is preferably between 32% and 52%, and most preferably between 40% and 45%.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of apparatus used for the manufacture of phosphoric acid in accordance with the present invention; and FIG. 2 is microscopic photographs of gypsum crystals manufactured under different manufacturing conditions (magnified 100 times).

FIG. 2 will be discussed more particularly in the examples.

Referring more particularly to FIG. 1, it is seen that in a preferred arrangement according to the present invention that decomposing tanks 1 and 2 are placed near each other and connected by means of coupling trough 12. Following the decomposing tanks are four hydrating tanks 5, 6, 7 and 8, hydrating tank 5 being connected to decomposing tank 2 by means of coupling trough 13, and hydrating tanks 6, 7 and 8 being connected respectively to the preceding hydrating tank by coupling troughs 14, 15 and 16.

The last hydrating tank 8 is then connected by coupling trough 17 to a slurry receiving tank 9. The decomposing tanks 1 and 2, the hydrating tanks 5, 6, 7 and 8, and the slurry receiving tank 9 are all provided with agitators 11.

Conduits 22, 23, 24 and 25 are connected to the decomposing tank 1. The dilute phosphoric acid is introduced through conduit 22, sulfuric acid through conduit 23, easily reacting silica through conduit 24, and phosphate rock powder through conduit 25, all into the decomposing tank 1. Conduits 24 and 25 may be substituted by a single conduit so that the easily reacting silica and phosphate rock powder can be charged through the same conduit.

Connected to the first hydrating tank 5 is a seed making apparatus 4 provided with conduits 30, 31 and 32, the seed making apparatus 4 being connected to the hydrating tank 5 by conduit 26 through which the seeds of calcium sulfate dihydrate produced in the seed making apparatus are introduced into the hydrating tank 5.

The slurry receiving tank 9 is connected to a vacuum cooler 3 by conduit 27 so that gypsum dihydrate slurry is pumped by means of pump $P_1$ to the vacuum cooler 3, where water is evaporated and the cooled slurry is then introduced into the first hydrating tank 5 by conduit 27'.

Slurry receiving tank 9 is also provided with an outlet conduit 28 so that a part of the gypsum dihydrate slurry is pumped by means of pump $P_2$ to the filtering and washing apparatus 10 which separates the phosphoric acid from the gypsum. The phosphoric acid is introduced into the product tank 19 by means of pump $P_3$, and the gypsum after being washed with water is discharged as the product gypsum by apparatus 29, while dilute phosphoric acid from the washing which is recovered in middle tank 20 is fed to the first decomposing tank 1 through conduit 22 by means of pump $P_4$.

It is apparent that in the above mentioned apparatus the number of decomposing tanks (1 and 2) and the number of the hydrating tanks (5, 6, 7 and 8) can be increased or decreased, if necessary. Moreover, the slurry receiving tank 9 can be omitted if substituted by the last hydrating tank such as the hydrating tank 8 in the example.

The following examples are given to further illustrate the present invention, reference being had in the example to the apparatus of FIG. 1. The scope of the invention is not, however, meant to be limited to the specific details of the examples.

EXAMPLE 1

First, for the manufacture of seeds, Florida phosphate rock ($P_2O_5$ 31.0%; T·CaO 46.0%) is reduced to a powder such that 90% pass through a sieve of 200 mesh. 100 kg. of this pulverized phosphate rock is added little by little through conduit 31 into 321 kg. of phosphoric acid solution ($P_2O_5$ 6.9%) which was introduced into the seed making apparatus 4 through conduit 30. The temperautre in the apparatus is maintained at about 90° C. while agitating the solution, and after all of the phosphate is charged, the solution is thoroughly agitated to become a slurry which is kept at a temperature of 50–70° C. Then 92.5 kg. of 98% sulfuric acid is added to the slurry through conduit 32 and the reaction is maintained for one hour or more for the purpose of making a mixture of calcium sulfuric dihydrate crystals as fine as about 10 microns, and phosphoric acid solution.

In another way of proceeding, 100 kg. of the abovementioned pulverized phosphate rock powder is charged little by little into a mixture of 321 kg. of water and 92.5 kg. of 98% sulfuric acid, or a mixed acid of phosphoric acid and sulfuric acid, mixed in the ratio indicated above, while maintaining the temperautre at about 40–70° C.

As a substitute for this seed, calcium sulfate dihydrate crystals of the above-mentioned size can be obtained by reacting 535.5 kg. of dilute phosphoric acid solution ($P_2O_5$ 14.5%) and 139 kg. of 98% sulfuric acid with 100 kg. of slaked lime (CaO 72%). The obtained calcium sulfate dihydrate crystals are of the same size as in the previous case. It is also possible in this case to obtain the same crystals by using 674.5 kg. of 20.2% sulfuric acid in place of dilute phosphoric acid solution and sulfuric acid.

The same seed can also be obtained by causing 394.5 kg. of dilute phosphoric acid solution ($P_2O_5$ 14.7) and 104.2 kg. of 98% sulfuric acid, or 498.7 kg. of 20.4% sulfuric acid, to act on 100 kg. of limestone (CaO 54.0%).

The same seed can also be obtained by causing 462.4 kg. of dilute phosphoric acid solution ($P_2O_5$ 13.5%) and 126.1 kg. of 98% sulfuric acid, or 586 kg. of 21% sulfuric acid, to act on 100 kg. of lime silicate (CaO 46.1%).

For the most part the fine gypsum crystals obtained in the above mentioned manner are of the twin type and can be used as seeds without filtering or further treatment.

The first decomposing tank 1 is charged with 60.2 kg./min. of 98% sulfuric acid through conduit 23, about 172.2 kg./min. of dilute phosphoric acid ($P_2O_5$ 18.6%) from the middle tank 20 by means of conduit 22, 0.67 kg./min. of diatomaceous earth ($SiO_2$ 73%) through conduit 24, and 69.7 kg./min. of Florida phosphate rock ($P_2O_5$ 31.0%, T·CaO 46.0%), pulverized such that 90% of the particles pass through a sieve of 200 mesh size, through conduit 25. The charge of materials is maintained at a temperature of 90° C. for about 2 hours in the first decomposing tank 1 and the second decomposing tank 2, for complete decomposition, and about 287.6 kg./min. of the decomposed slurry which consists of 30% solid components, 70% liquid components ($P_2O_5$ 26%), and having a specific gravity of about 1.60 is introduced into the first hydrating tank 5. The concentration of the sulfuric acid is checked at the outlet of the second decomposing tank 2 and the stop cock in the conduit 23 is adjusted from time so that the concentration of sulfuric acid is maintained at a standard value (excess of 3%).

805 kg./min. of circulating slurry (gypsum and other solid components 36%, liquid components ($P_2O_5$ 30%) 64%) is introduced through conduit 27' into the first hydrating tank 5 after having passed through the vacuum cooler 3, and in addition 1 kg./min. of the seeds are added from the seed making apparatus 4 to the first hydrating tank 5 through the conduit 26. The circuating slurry results in adjustment of the temperature of the first to the fourth hydrating tanks 5, 6, 7 and 8 so as to be maintained at about 60° C.

After the hydration is completed (two hours and thirty minutes) the slurry is introduced into the receiving tank 9. 805 kg./min. of the slurry are pumped from the receiving tank through the vacuum cooler 3 to the first hydrating tank 5, and at the same time, 278.4 kg./min. of slurry is pumped to the filtering-washing apparatus 10 and dilute phosphoric acid obtained by filtering and washing in the filtering-washing apparatus 10 is recovered and led to the first decomposing tank 1 through conduit 22.

At the end of the filtering-washing apparatus 10, 131.5 kg./min. of gypsum (containing free water 23% and T·$P_2O_5$ 0.15%) was produced. The obtained gypsum is shown in photograph A of FIG. 2, is of uniform crystals of about 300–700 microns.

Moreover, in this case, 70.6 kg./min. of the phosphoric acid product ($P_2O_5$ 30.0%) is obtained in the first tank 19, making the rate of recovering 98.0%.

In the above described example with the apparatus described, phosphoric acid and phosphate rock are charged separately so as to produce a good calcium sulfate semihydrate. Even under the same conditions, when phosphate rock and phosphoric acid are mixed before they are charged into the decomposing tank, fine solid particles considered to be calcium sulfate dihydrate including much water of crystallization is produced and the same do not properly grow in the hydrating tank, resulting in poor filtration. On the other hand, when they are charged separately, only gypsum semihydrate is produced under the same conditions, and in the hydration process, good growth of the crystals and easy filtration results.

For comparative purposes the above example was carried out in a test under the same conditions, with the exception that the seeds of the present invention were not added. The gypsum obtained at the 6.3 hours of hydration is shown in photograph B of FIG. 2, and this is clearly far inferior to that obtained according to the present invention as shown in photograph A of the same figure.

EXAMPLE 2

The same seed crystals as in Example 1 are produced in the seed making apparatus 4, and sulfuric acid and phosphoric acid solution is fed to the first decomposing tank in the same way as in Example 1. In this case, however, easily reacting silica was not used, and instead, 57.6 kg./min. of Florida phosphate rock ($P_2O_5$ 36.9% T·CaO 54.0%) roasted at about 1000° C. and pulzerized to the same grain size as in Example 1 was charged together with 72.6 kg./min. of 80% sulfuric acid and 223 kg./min. of dilute phosphoric acid ($P_2O_5$ 20.6%).

The further operation was the same as in Example 1. After hydration, for 2 hours, in the hydrating tanks 5, 6, 7 and 8, 136 kg./min. of the gypsum product (free water 23% T·$P_2O_5$ 0.15%) is obtained from apparatus 10 at the end of the filtering-washing procedure. The quantity of the phosphoric acid product in this case is 74.5 kg./min. (concentration of phosphoric acid $P_2O_5$ 28.0%), and the rate of recovery is 98.3%.

The crystals of the gypsum product is shown in photograph C of FIG. 2, which is almost the same as that shown in photograph A of FIG. 2.

It is clear from the above description that the present invention, which uses special seeds and in addition employs suitable measures to eliminate the factors which interfere with the formation and growth of crystals, has made it possible to industrially produce phosphoric acid by the wet phosphoric acid method using the semihydrate-dihydrate method, which prior to the present invention could not be used industrially. In succeeding in obtaining the gypsum product of large crystal size, by raising the rate of recovery of phosphoric acid and gypsum, as well as improving their quantity, and at the same time, in shortening the time of processing and simplifying the necessary apparatus used, the present invention permits the manufacture of these products under highly advantageous operating conditions which can be easily used for industrial purposes.

It will be understood that each of the elements described above, or two or more together, may also find a useful application in other types of process and apparatus differing from the types described above.

What is claimed as new and desired to be secured by Letters Patent is:

1. The continuous process of making phosphoric acid and gypsum by the hemihydrate-dihydrate calcium sulfate method, the said process comprising the steps of decomposing phosphate rock by the action thereon of a mixture of sulfuric acid and phosphoric acid so as to form a slurry containing calcium sulfate hemihydrate, the said decomposition being carried out at a temperature above the temperature of transition of hemihydrate into dihydrate and while the concentration of sulfuric acid in the thus obtained hemihydrate slurry is maintained above 2% and the total concentration in said slurry of said sulfuric acid and phosphoric acid, the latter calculated as $P_2O_5$, being below about 35%; then hydrating said calcium sulfate hemihydrate to calcium sulfate dihydrate at a temperature of 45 to 70° C. by adding separately formed calcium sulfate dihydrate seed crystals of the twin crystal type of a size between about 5 and 50 microns and directly obtained by decomposing a lime-containing substance with sulfuric acid or sulfuric acid containing phosphoric acid at a temperature below said transition temperature, said hydrating resulting in the precipitation of said calcium sulfate in the form of a dihydrate slurry; separating the phosphoric acid and gypsum from the slurry; and recirculating so much of the calcium sulfate dihydrate slurry back to the hemihydrate slurry to provide for a ratio of recirculated dihydrate slurry to hemihydrate slurry received from the decomposition step between 2:1 and 4:1.

2. The process of claim 1, wherein the concentration of sulfuric acid in said hemihydrate slurry is maintained at a level from above 2 to about 5%.

3. A process as defined in claim 1, wherein said lime-containing substance is selected from the group consisting of phosphate rock, limestone, slaked lime and lime silicate.

4. A process as defined in claim 1, wherein said phosphate rock is selected from the group consisting of Florida phosphate rock, Israel phosphate rock, Makatea, Morocco phosphate rock, Kosier and Togo phosphate rocks.

5. The process of claim 1, including adding to the said hemihydrate-containing slurry an active silica or derivative thereof adapted to absorb the organic impurities present in said phosphate rock.

6. The process of claim 5, wherein said active silica or derivative is selected from the group consisting of diatomaceous earth, silica gel, bentonite and silica slag.

7. The proces of claim 5, wherein the phosphate rock prior to decomposition contains fluorinated compounds which in the decomposition are converted to hydrofluoric acid, and including adding a sufficient amount of said silica or derivative thereof to react with the hydrofluoric acid to convert the same to hydrofluorosilicic ($H_2SiF_6$).

8. The process of claim 5, wherein the active silica or derivative thereof is added in an amount of up to 3% by weight of the phosphate rock.

9. The process of claim 7, wherein the phosphate rock prior to said acid decomposition is subjected to calcining at a time and temperature sufficient to carbonize and remove organic impurities present therein.

10. The process of claim 9, wherein the calcining step is carried out at a temperature between about 600 and 1200° C.

References Cited

UNITED STATES PATENTS

| | | | |
|---|---|---|---|
| 1,969,449 | 8/1934 | Bryan | 23—165 X |
| 3,124,419 | 3/1964 | Germain et al. | 23—165 |
| 3,192,014 | 6/1965 | Leyshon et al. | 23—165 |
| 1,962,887 | 6/1934 | Ashley et al. | 23—122 |

FOREIGN PATENTS

37/3,701    6/1962    Japan.

HERBERT T. CARTER, Primary Examiner

U.S. Cl. X.R.

23—165